United States Patent
Crona

(10) Patent No.: US 11,568,635 B2
(45) Date of Patent: Jan. 31, 2023

(54) APPARATUS FOR RECORDING LICENSE PLATES OF VEHICLES

(71) Applicant: Kapsch TrafficCom AG, Vienna (AT)

(72) Inventor: Björn Crona, Jönköping (SE)

(73) Assignee: Kapsch TrafficCom AG, Vienna (AT)

( * ) Notice: Subject to any disclaimer, the term of this patent is extended or adjusted under 35 U.S.C. 154(b) by 239 days.

(21) Appl. No.: 16/895,883

(22) Filed: Jun. 8, 2020

(65) Prior Publication Data
US 2020/0391678 A1 Dec. 17, 2020

(30) Foreign Application Priority Data

Jun. 17, 2019 (EP) ..................... 19180519

(51) Int. Cl.
*G06V 20/58* (2022.01)
*G06V 20/00* (2022.01)
(Continued)

(52) U.S. Cl.
CPC ............ *G06V 20/00* (2022.01); *B60R 13/105* (2013.01); *G06V 20/58* (2022.01); *G08G 1/04* (2013.01);
(Continued)

(58) Field of Classification Search
CPC ...... G06V 20/00; G06V 20/58; G06V 20/625; G06V 20/54; G06V 10/255;
(Continued)

(56) References Cited

U.S. PATENT DOCUMENTS 9,111,136 B2 8/2015 Paul et al.
2006/0278705 A1* 12/2006 Hedley ................ G07B 15/063
235/382
(Continued)

FOREIGN PATENT DOCUMENTS

AU 2015200711 A1 * 9/2015 ............. G01S 13/52
CA 2998175 A1 * 9/2013 ............. G01S 17/58
(Continued)

OTHER PUBLICATIONS

Extended European Search Report received for European Patent Application No. 19180519.1, dated Dec. 18, 2019, 7 pages.

*Primary Examiner* — Nay A Maung
*Assistant Examiner* — Kathleen M Broughton
(74) *Attorney, Agent, or Firm* — Fiala & Weaver P.L.L.C.

(57) ABSTRACT

An apparatus for recording license plates of vehicles travelling on a road having several adjacent lanes comprises a vehicle classification sensor configured to detect a predetermined shape characteristic of a vehicle or group of vehicles. The apparatus further comprises at least one camera mounted at an elevated point beside one of the lanes and having an angle of aperture covering at least one of said lanes, each lane covered by at least one camera. The vehicle classification sensor is configured to, upon detecting the predetermined shape characteristic on a lane, trigger the camera that covers the lane the predetermined shape characteristic is detected on to record an image of a license plate on the back of the vehicle or group's leading vehicle, respectively, for which the predetermined shape characteristic is detected. The triggered camera is of a lane either adjacent to or at least one lane apart from the lane.

20 Claims, 2 Drawing Sheets

Figure 1:
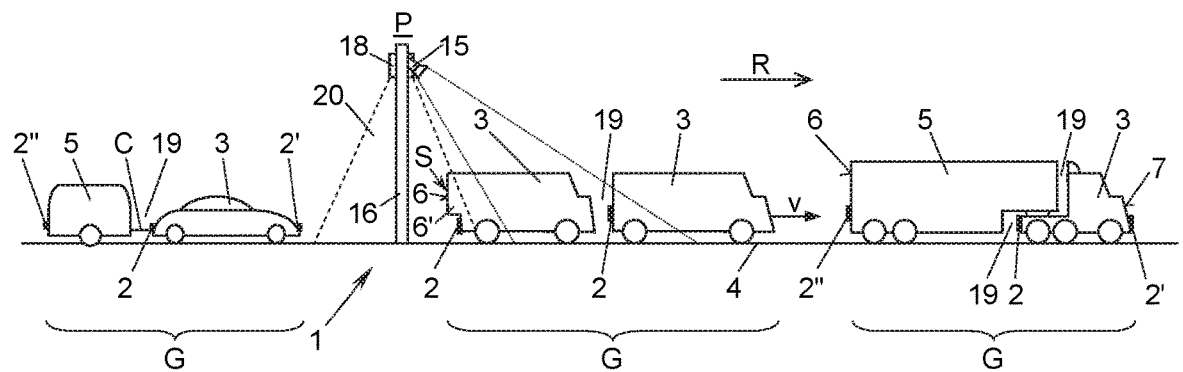

(51) Int. Cl.
*B60R 13/10* (2006.01)
*G08G 1/04* (2006.01)
*G06V 20/62* (2022.01)

(52) U.S. Cl.
CPC ........ *G06V 20/625* (2022.01); *G06V 2201/08* (2022.01)

(58) Field of Classification Search
CPC .... G06V 2201/08; B60R 13/105; G08G 1/04; G08G 1/0129; G08G 1/015; G08G 1/0175; G08G 1/052; G08G 1/0116
See application file for complete search history.

(56) References Cited

U.S. PATENT DOCUMENTS

| | | | |
|---|---|---|---|
| 2009/0174778 A1* | 7/2009 | Allen ................... | G08G 1/042 348/149 |
| 2014/0159925 A1 | 6/2014 | Mimeault et al. | |
| 2015/0178911 A1* | 6/2015 | Choi ....................... | G06T 7/593 382/104 |
| 2017/0330454 A1* | 11/2017 | Bäckvall ................. | G06T 7/285 |

FOREIGN PATENT DOCUMENTS

| | | | | |
|---|---|---|---|---|
| CN | 100419813 C | * | 9/2008 | |
| CN | 106652063 A | * | 5/2017 | |
| WO | WO-2013128427 A1 | * | 9/2013 | ............. G01S 17/58 |

* cited by examiner

APPARATUS FOR RECORDING LICENSE PLATES OF VEHICLES

CROSS-REFERENCE TO RELATED APPLICATION(S)

This application claims priority to European Patent Application No. 19 180 519.1, filed on Jun. 17, 2019, the entirety of which is incorporated by reference herein.

BACKGROUND

Technical Field

The present disclosed subject matter relates to an apparatus for recording license plates of vehicles travelling on a road with several adjacent lanes, wherein some of the vehicles tow a trailer.

Background Art

Recording license plates of vehicles is an important task in ITS (Intelligent Transportation Systems) and vehicle tolling applications to identify vehicles for surveillance, routing and tolling. To this end, APNR (Automatic Plate Number Recognition) cameras are installed above the road or each lane in case of a multi-lane road to capture images of the license plates for recording and, eventually, machine-reading of license plate numbers on the license plates by OCR (Optical Character Recognition).

These APNR cameras usually capture a vehicle from behind when it has passed the camera. One reason is that in some countries vehicles do not necessarily have a front license plate but always a rear license plate. Another reason is that for privacy and data protection concerns images of vehicles may only be allowed to be captured when a traffic or tolling violation has occurred, as it is detected by surveillance equipment at the camera site, so that the camera can only capture the rear of a vehicle when it has passed the equipment. Or, APNR cameras need to take the rear image because both front and rear images are desired for high performance ITS.

When a vehicle tows a trailer or is closely followed by another vehicle it may be difficult to capture a license plates on the back of the towing or first vehicle as it may be occluded by the trailer or second vehicle. This leads to false or missed recordings of license plates for such vehicles. The same may apply to vehicles with back portions that overhang the license plate so that an elevated APNR camera cannot view the recessed license plate.

BRIEF SUMMARY

It is therefore an object of the disclosed subject matter to provide an apparatus for reliably recording license plates of vehicles regardless whether they tow a trailer, are closely followed by another vehicle or have a recessed license plate.

To this end the disclosed subject matter provides an apparatus for recording license plates of vehicles travelling on a road having several adjacent lanes, which apparatus comprises:

a vehicle classification sensor configured to detect a predetermined shape characteristic of a vehicle or group of vehicles; and at least one camera mounted at an elevated point beside one of the lanes and having an angle of aperture covering at least one of said lanes, each lane being covered by at least one camera;

wherein the vehicle classification sensor is configured to, upon detecting the predetermined shape characteristic on a lane, trigger the camera that covers the lane the predetermined shape characteristic is detected on to record an image of a license plate on the back of the vehicle or leading vehicle of the group, respectively, for which the predetermined shape characteristic is detected; and wherein the triggered camera is the camera of a lane either adjacent to or at least one lane apart from that lane on which the predetermined shape characteristic is detected.

The disclosed subject matter exploits lane cameras at multi-lane roads in a novel way in that a camera of an adjacent or even further apart lane is used to gain an oblique or side view into a gap between a vehicle and its trailer or following vehicle to record the rear license plate of the towing or first vehicle. This also works to capture recessed back license plates of single vehicles. In this way, the problem of license plate obstruction by overhanging back portions, trailers or following vehicles is overcome, without any additional hardware necessary, just by using different cameras across the multi-lane road. The cameras can, e.g., be conventional APNR cameras mounted on a beam or gantry spanning the road.

In a first embodiment of the disclosed subject matter specifically adapted to capture recessed license plates under overhanging back portions of single vehicles, the predetermined shape characteristic is a predetermined shape of the back of a vehicle.

In a second embodiment the predetermined shape characteristic may be a predetermined length of a vehicle or group, which length is above a predetermined first threshold. This embodiment is based on the insight that vehicles towing trailers or groups of vehicles are significantly longer than single vehicles.

In a third embodiment the predetermined shape characteristic is a gap between the leading vehicle and the following vehicle of a group, the width of which gap is below a second threshold. The following vehicle may either be a trailer towed by the first vehicle or just another vehicle closely following the first vehicle.

Optionally, the second threshold is dependent on the height or height profile of the following vehicle in the group as measured by the vehicle classification sensor. Thus, the predetermined shape characteristic is a combination of the width of the gap and the height (profile) of the following vehicle. The lower the following vehicle is, the closer it can be to the leading vehicle without occluding the view into the gap to record the license plate.

In a fourth embodiment, the predetermined shape characteristic is a towing connection between the leading vehicle and the following vehicle of a group, for example a tow bar.

Optionally, the triggered camera has an angle of aperture covering both the lane on which the predetermined shape characteristic is detected and the lane for which it is mounted. A camera can thus be used for dual purposes: as a conventional camera dedicated to a lane, and as a novel side-view camera capturing license plates of the vehicles.

In a first variant of the disclosed subject matter each lane has an own camera. Such dedicated lane cameras can be mounted, e.g., beside the respective lane, or, optionally, directly above the lane.

In a second variant of the disclosed subject matter two adjacent lanes share a same camera. The number of cameras necessary for the entire multi-lane road can thus be reduced to, e.g., two cameras for three lanes, or three cameras for four lanes, etc. Again, such shared cameras can be mounted anywhere across the width of the multi-lane road as long as their angles of aperture are adjusted accordingly. Optionally, each shared camera is mounted between its two lanes, which yields a symmetric setup.

In any embodiment, the vehicle classification sensor and the cameras can be mounted on a gantry spanning the road, to ease installation.

According to a further embodiment of the disclosed subject matter the vehicle classification sensor is configured to, upon detecting a predetermined shape characteristic on a lane, trigger the respective camera with a delay. This is particularly useful when the vehicle classification sensor and the cameras are mounted on a common gantry, to set the distance at which the passing vehicle or group is captured by a camera for an optimal viewing angle of the camera.

Optionally, the vehicle classification sensor is configured to measure a speed of the vehicle or group, and the delay is dependent on the measured speed. In this way, the camera can be triggered at always the same distance from the gantry, irrespective of the speed of the vehicle, for an optimal viewing angle.

The vehicle classification sensor can be any technical means capable of detecting the predetermined shape characteristic of the vehicle or group of vehicles, respectively, e.g., a light barrier across the road, a radar scanner, etc. In a further embodiment, however, the vehicle classification sensor comprises at least one stereoscopic camera or laser scanner configured to capture 3D representations of passing vehicles or groups and a processor configured to detect said predetermined shape characteristic from said 3D representations. Stereoscopic cameras or laser scanners achieve a sufficiently high resolution to reliably detect shapes, gaps, lengths, widths etc indicative of a vehicle with an overhanging back, a vehicle towing a trailer or a vehicle closely followed by another vehicle. Concurrently they yield a 3D representation of the shape of vehicle or group so that the triggering delay of the camera can be adapted to this shape for an optimal view of the rear license plate of the vehicle or first vehicle of the group.

BRIEF DESCRIPTION OF THE DRAWINGS/FIGURES

Figure 2:
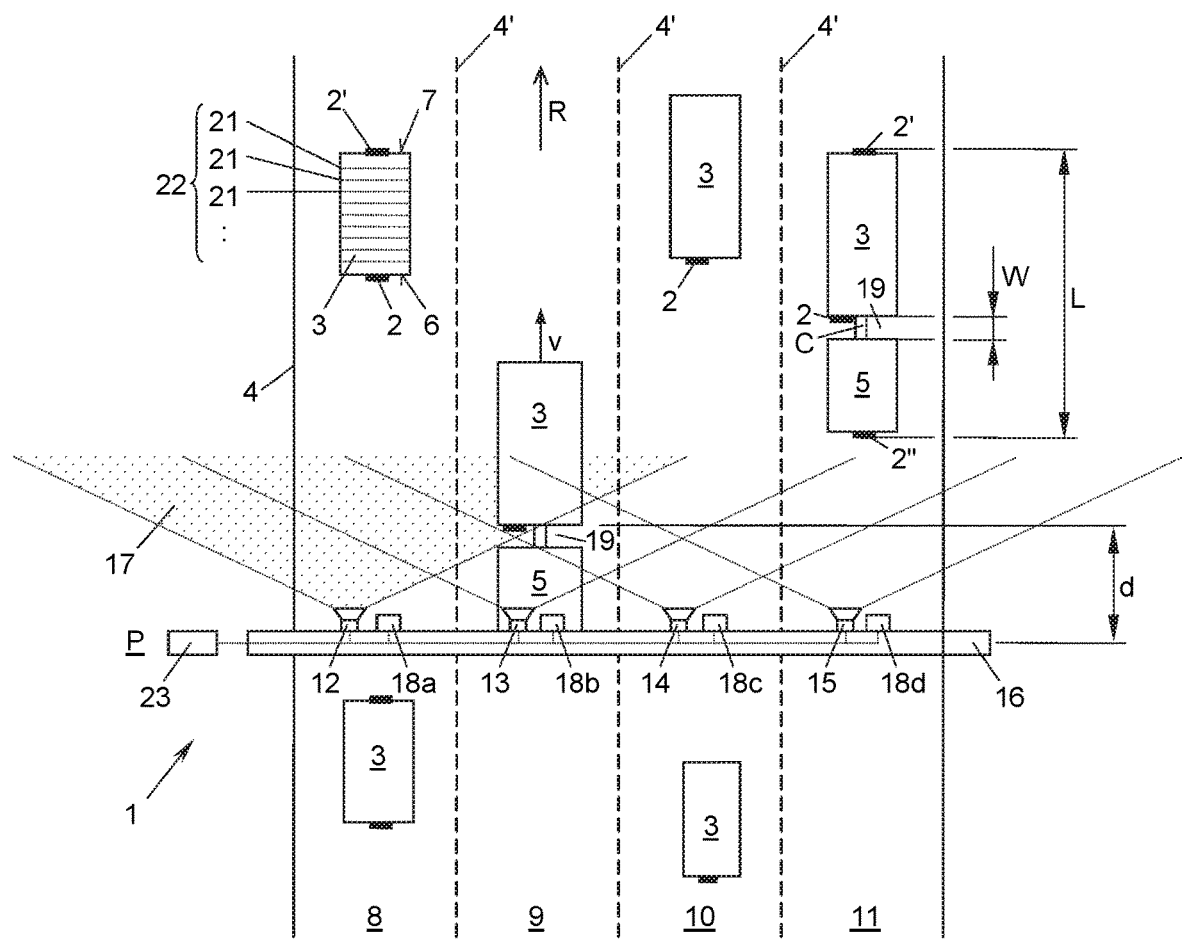
Figure 3:
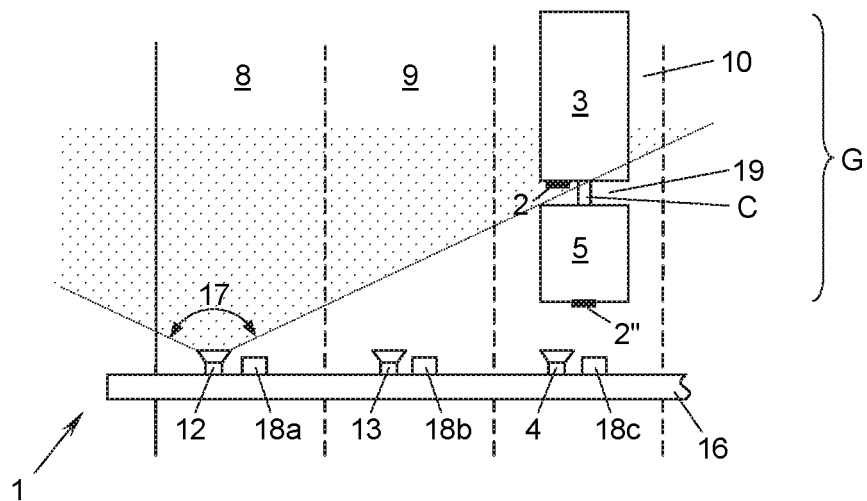
Figure 4:
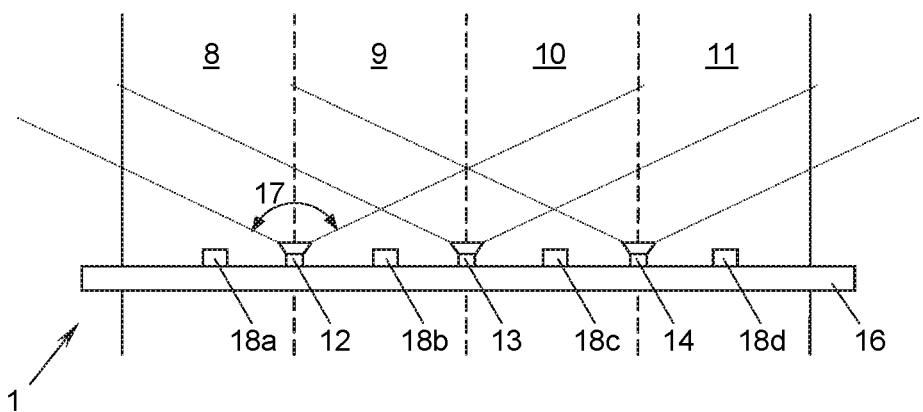
Figure 5:
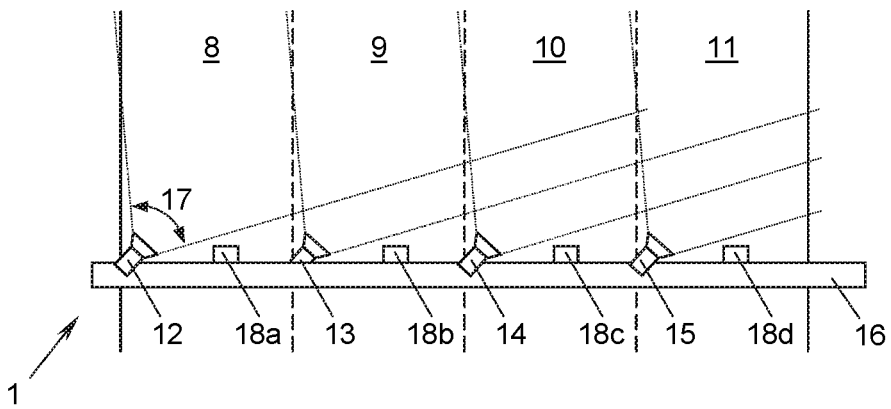

The disclosed subject matter will now be described by means of exemplary embodiments thereof with reference to the enclosed drawings, in which:

FIGS. 1 and 2 show a first embodiment of the apparatus of the disclosed subject matter in a side view (FIG. 1) and a top view (FIG. 2); and FIGS. 3-5 show a second, third, and fourth embodiment of the apparatus of the disclosed subject matter in a top view, respectively.

DETAILED DESCRIPTION

FIGS. 1 and 2 show an apparatus 1 for recording license plates 2 of vehicles 3 travelling on a road 4 in a direction of travel R. Some of the vehicles 3 may tow another vehicle 3, e.g., a trailer 5 (see the two vehicles 3, 5 on the left in FIG. 1), and some of the vehicles 3 may be closely followed by another vehicle 3 (see the two vehicles 3 in the centre of FIG. 1). A trailer 5 may also be a so-called "semi-trailer" (see the two vehicle 3, 5 on the right in FIG. 1). A vehicle 3 together with its trailer 5 or a vehicle 3 together with a following vehicle 3 forms a group G.

The vehicles 3 are each equipped with a rear license plate 2 on the back 6 of the vehicle 3 and—usually, but not necessarily—with a front license plate 2' on the front 7 of the vehicle 3. A trailer 5 may also have an own license plate 2" at its back.

On some vehicles 3, a portion 6' of the back 6 may overhang the rear license plate 2, i.e., the rear license plate 2 is recessed with respect to the overhanging portion 6'. Due to this peculiar shape S of the back 6 the license plate 2 may not be visible under steep viewing angles from above, but only under shallow viewing angles.

The road 4 is a multi-lane road with two or more adjacent lanes 8-11, and vehicles 3 or groups G can travel on any lane 8-11. It goes without saying that the lanes 8-11 need not necessarily be distinctly marked on the road 4, such as by lane markings 4' painted on the road 4. Rather, the road 4 could just be broad enough that two or more vehicles 3 or groups G can travel beside each other on "implicit", "tacit" lanes 8-11.

The apparatus 1 records the license plates 2 on the backs 6 of the vehicles 3 and is particularly adapted to overcome the problem of a possible occlusion of such a rear license plate 2 by an overhanging back portion 6', a trailer 5 or a closely following vehicle 3. To this end, the apparatus 1 comprises a set of cameras 12-15, each of which is mounted at an elevated point P beside one of the lanes 8-11, e.g., on individual posts or pillars, a beam across the road 4, or a common gantry 16 spanning the road 4. In the embodiment of FIGS. 1 and 2, each camera 12-15 is mounted above one of the lanes 8-11; the definition, that each camera 12-15 is "beside" a lane refers to the fact that, e.g., the camera 12 is mounted beside the lanes 9-11, the camera 13 is mounted beside the lanes 8, 10, and 11, the camera 14 is mounted beside the lanes 8, 9, and 11, and the camera 15 is mounted beside the lanes 8-10. Each camera 12-15 has an angle of aperture 17, which covers at least one of the lanes 8-11, and each lane 8-11 is covered by at least one camera 12-15.

In addition to the cameras 12-15 the apparatus 1 comprises a vehicle classification sensor 18. The vehicle classification sensor 18 can be a single entity mounted beside or above the road 4 or, as shown in FIG. 2, a distributed entity with individual sensor heads 18a-18d each mounted above a lane 8-11. The vehicle classification sensor 18 can be any technical means which is able to detect a predetermined shape characteristic of a vehicle 3 or group G which passes the sensor 18, e.g., a light barrier across the road 4 which detects a predetermined shape S of the back 6 of a passing vehicle 3, which shape S is indicative of an overhanging back portion 6' above the license plate 2.

Alternatively, the vehicle classification sensor 18 detects a gap 19 between two vehicles 3 closely following each other, such as a vehicle 3 and its trailer 5, which gap 19 has a width W that is below a predetermined maximum threshold $W_{max}$. The threshold $W_{max}$ can, e.g., be in the range of 0.5-20 m, in particular 1-10 m or 1-5 m.

The threshold $W_{max}$ may optionally be dependent on the height or height profile of the following vehicle 3 or trailer 5 as measured by the vehicle classification sensor 18. Also the mounting point P of the cameras 12-15, the trigger distance d (explained further down below) and/or the expected mounting height of license plates 2 can be taken into account to set the threshold $W_{max}$ accordingly. For example, the lower the following vehicle 3 or trailer 5 is, the closer it can be to the leading vehicle 3 of the group G without occluding the view into the gap 19 to record the license plate 2.

In another variant, the vehicle classification sensor 18 detects a length L in the direction of travel R of a passing vehicle 2 or group G, which length L is above a predetermined minimum threshold $L_{min}$. The threshold $L_{min}$ can, e.g., be in the range of 3-20 m, in particular 3-10 m or 3-5 m.

In a further variant, the vehicle classification sensor 18 detects a towing connection C, such as a tow bar, between a vehicle 3 and its trailer 5.

Other predetermined shape characteristics can also be used as detection criteria, e.g., any other dimension or shape class of a vehicle 3 or group G.

It is also possible that the detection criterion is composed of several of the above-mentioned criteria, i.e., a vehicle classification sensor 18 triggers the respective camera only when two or more of said criteria are met by a passing vehicle 3 or group G on a lane.

In the embodiment shown in FIGS. 1 and 2 the vehicle classification sensor 18, and in particular each of its sensor heads 18*a*-18*d*, is a laser scanner projecting a fan 20 of light rays onto each lane 8-11. From reflections of the light rays of the fan 20 the shape of a vehicle 3 or group G can be recorded in the sensor 18, e.g., by time-of-flight or interference measurements on the projected and reflected light rays. When only moving vehicles 3 or groups G shall be scanned, the light ray fan 20 can be kept stationary, and the passing of a vehicle 3 or group G yields a sequence of scan lines 21 thereon. The entirety of the scan lines 21 form a 3D representation 22 of the shape of the vehicle 3 or group G. When also stationary vehicles 3 or group G shall be scanned, the light ray fan 18 can be swept, e.g., in the direction of travel R, to scan a vehicle 3 or group G at rest under the vehicle classification sensor 18.

The vehicle classification sensor 18 includes a processor 23, e.g., connected to the output of the sensor heads 18*a*-18*d*, which receives 3D representations 22 of passing vehicles 3 or groups G and detects the predetermined shape characteristic S, L, W, C therein. When the vehicle classification sensor 18 detects one or more of these characteristics it also knows the lane 8-11 on which said characteristic/s was/were detected, e.g., by identifying the respective sensor head 18*a*-18*d*.

It goes without saying that instead of a distributed vehicle classification sensor 18 with individual sensor heads or laser scanners 18*a*-18*d* for each lane 8-11 a common vehicle classification sensor 18 for several or all lanes 8-11 can be used, e.g., a laser scanner the fan 20 of which covers all lanes 8-11 and is capable of detecting multiple vehicles 3 groups G at the same time on different lanes 8-11. Furthermore, instead of a vehicle classification sensor 18 in form of one or more laser scanners the vehicle classification sensor 18 can be implemented as one or more stereoscopic cameras which capture the 3D representations 22, or even one or more radar scanners for this purpose. In another embodiment the vehicle classification sensor 18 can be implemented by one or more 2D cameras, the video streams of which are processed by image processing algorithms to detect the predetermined shape characteristic of a vehicle 3 or group G.

When the vehicle classification sensor 18 has detected the occurrence of a predetermined shape characteristic S, C, W, L on one of the lanes 8-11, it triggers one of the cameras 12-15 which is adjacent to—or at least one lane apart from—that lane 8-11 on which said characteristic was detected. In the example depicted in FIG. 2 a gap 19 was detected with a width $W<W_{max}$ by the vehicle classification sensor 18 on the second lane 9, and one of the cameras 12, 14, and 15 of the other lanes 8, 10, and 11 is triggered. In the present example the camera 12 of the left adjacent lane 8 is triggered.

The camera 12 of the adjacent lane 12 has—due to its wide angle of aperture 17 and its adjacent position—a view more oblique or more from the side into the gap 19 or under the overhanging back portion 6' than the camera 13 of the lane 9 on which the predetermined shape characteristic was detected. The adjacent camera 12 can thus view the rear license plate 2 on the back 6 of the vehicle 3 without being obstructed by an overhanging back portion 6', a closely following vehicle 3 or a towed trailer 5, respectively.

If the apparatus 1 is deployed in areas where vehicles 3 have their rear license plates 2 usually mounted on the left at the back 6 of the vehicle 3, a camera of one of the lanes left to the lane on which the characteristic S, L, W, C was detected is triggered. In areas where the rear license plate 2 is usually mounted at the right at the back 6 of the vehicle 3, a camera on one of the lanes right to the lane 9 on which the characteristic S, L, W, C was detected is triggered.

Once the triggered camera 12-15 has recorded the rear license plate 2 of the vehicle 3 in an image, the image can then be used for further processing, e.g., for APNR (Automatic Plate Number Recognition) or OCR (Optical Character Recognition) purposes.

As can be seen from FIG. 2 there may be an optimal distance d from the mounting point P of the cameras 12-15 (here: from the gantry 16) at which the respective camera 12-15 is triggered, depending on the angle of aperture 17 of the respective camera 12-15 and the width of the lanes 8-11, to have an optimal "insight" under the overhanging back portion 6' or into the gap 19 for recording a license plate 2. The vehicle classification sensor 18 may therefore trigger the respective camera 12-15 with a certain delay Δt after having detected the predetermined shape characteristic S, L, W, C which delay Δt is a function of the optimal distance d and the speed v of the vehicle 3 or group G. To this end, the vehicle classification sensor 18—or any other technical means for measuring speeds of vehicles 3 or groups G—is configured to measure the speed v of the vehicle 3 or group G, e.g., from tracking its 3D representation 22 over time with the processor 23, and to adjust the trigger delay Δt correspondingly. Of course, if the vehicle classification sensor 18 and the cameras 12-15 are mounted at different positions along the direction of travel R, the trigger delay Δt has to be adjusted accordingly with the aim to achieve an optimal trigger distance d from the respective triggered camera 12-15 for an optimal insight and field-of-view of the camera into the overhang or gap.

FIG. 3 shows a slight modification of the apparatus 1 of FIGS. 1 and 2 in that the vehicle classification sensor 18, upon detection of the predetermined shape characteristic S, L, W, C on the lane 10, does not trigger the camera 13 on the adjacent lane 9 but on a lane further apart, here, the lane 8 one lane apart from the lane 10. The camera 12 on the lane 8 may have—depending on its angle of aperture 17—a view even more oblique or more from the side under the overhang 6' or into the gap 19 than the camera 13 on the adjacent lane 9 so that it can better record the license plate 2.

FIG. 4 shows a further embodiment of the apparatus 1 wherein each two adjacent lanes share a common camera so that, e.g., for four lanes 8-11 only three cameras 12-14 are necessary. Each camera 12-14 has an angle of aperture 17 covering at least two lanes, e.g., the two lanes between which it is mounted. This embodiment can be combined with the embodiment of FIG. 3 in that each shared camera 12-14 can also capture license plates under overhangs 6' or in gaps 19 on lanes further apart, e.g., the camera 12 can capture not only license plates on the lanes 8 and 9 but also on the lane 10, 11 etc.

FIG. 5 shows yet another embodiment of the apparatus 1 with an asymmetric setup of the cameras 12-15, wherein each camera 12-15 covers one or more lanes, e.g., the camera 12 can cover lane 8, or lanes 8 and 9, or lanes 8-10, or lanes 8-11, etc, so that four, three, two or even only one camera is required for the four lanes 8-11.

CONCLUSION

The disclosed subject matter is not restricted to the specific embodiments disclosed herein but encompasses all variants, modifications and combinations thereof that fall within the scope of the appended claims.

What is claimed is:

1. An apparatus for recording license plates of vehicles travelling on a road having several adjacent lanes, comprising:
   a vehicle classification sensor configured to detect a predetermined shape characteristic of a vehicle or group of vehicles, the vehicle classification sensor comprising
   at least two cameras each of which being mounted at an elevated point beside one of the lanes and having an angle of aperture covering at least a lane for which it is mounted and obliquely an adjacent lane, each lane being covered by at least two cameras;
   wherein the vehicle classification sensor is configured to, upon detecting the predetermined shape characteristic on a lane, trigger the camera that covers the lane the predetermined shape characteristic is detected on to record an image of a license plate on the back of the vehicle or leading vehicle of the group, respectively, for which the predetermined shape characteristic is detected;
   wherein the triggered camera is the camera mounted for a lane either adjacent to or at least one lane apart from that lane on which the predetermined shape characteristic is detected;
   wherein the predetermined shape characteristic includes a gap between the leading vehicle and the following vehicle of a group, the width of which gap is below a second threshold; and
   wherein the second threshold is dependent on a height or height profile of the following vehicle in the group as measured by the vehicle classification sensor.

2. The apparatus of claim 1, wherein the predetermined shape characteristic further includes a predetermined shape of the back of a vehicle.

3. The apparatus of claim 1, wherein the predetermined shape characteristic further includes a predetermined length of a vehicle or group, which length is above a predetermined first threshold.

4. The apparatus of claim 1, wherein each lane has an own camera.

5. The apparatus of claim 4, wherein each camera is mounted above its lane.

6. The apparatus of claim 1, wherein two adjacent lanes share a same camera.

7. The apparatus of claim 6, wherein each shared camera is mounted between its two lanes.

8. The apparatus of claim 1, wherein the vehicle classification sensor and the cameras are mounted on a gantry spanning the road.

9. The apparatus of claim 1, wherein the vehicle classification sensor is configured to, upon detecting a predetermined shape characteristic on a lane, trigger the respective camera with a delay.

10. The apparatus of claim 9, wherein the vehicle classification sensor is configured to measure a speed of the vehicle or group, wherein the delay is dependent from the measured speed.

11. The apparatus of claim 1, wherein the vehicle classification sensor comprises at least one stereoscopic camera or laser scanner configured to capture 3D representations of passing vehicles or groups and a processor configured to detect said predetermined shape characteristic from said 3D representations.

12. An apparatus for recording license plates of vehicles travelling on a road having several adjacent lanes, comprising:
   a vehicle classification sensor configured to detect a predetermined shape characteristic of a vehicle or group of vehicles, the vehicle classification sensor comprising
   at least two cameras each of which being mounted at an elevated point beside one of the lanes and having an angle of aperture covering at least a lane for which it is mounted and obliquely an adjacent lane, each lane being covered by at least two cameras;
   wherein the vehicle classification sensor is configured to, upon detecting the predetermined shape characteristic on a lane, trigger the camera that covers the lane the predetermined shape characteristic is detected on to record an image of a license plate on the back of the vehicle or leading vehicle of the group, respectively, for which the predetermined shape characteristic is detected;
   wherein the triggered camera is the camera mounted for a lane either adjacent to or at least one lane apart from that lane on which the predetermined shape characteristic is detected; and
   wherein the predetermined shape characteristic includes a towing connection between the leading vehicle and the following vehicle of a group.

13. The apparatus of claim 12, wherein the predetermined shape characteristic further includes a predetermined shape of the back of a vehicle.

14. The apparatus of claim 12, wherein the predetermined shape characteristic further includes a predetermined length of a vehicle or group, which length is above a predetermined first threshold.

15. The apparatus of claim 12, wherein each lane has an own camera.

16. The apparatus of claim 12, wherein two adjacent lanes share a same camera.

17. The apparatus of claim 12, wherein the vehicle classification sensor and the cameras are mounted on a gantry spanning the road.

18. The apparatus of claim 12, wherein the vehicle classification sensor is configured to, upon detecting a predetermined shape characteristic on a lane, trigger the respective camera with a delay.

19. The apparatus of claim 18, wherein the vehicle classification sensor is configured to measure a speed of the vehicle or group, wherein the delay is dependent from the measured speed.

20. The apparatus of claim 12, wherein the vehicle classification sensor comprises at least one stereoscopic camera or laser scanner configured to capture 3D representations of passing vehicles or groups and a processor configured to detect said predetermined shape characteristic from said 3D representations.

* * * * *